United States Patent [19]

Kim

[11] Patent Number: 5,713,121
[45] Date of Patent: Feb. 3, 1998

[54] METHOD OF MANUFACTURING A ROTARY HEAD DRUM

[75] Inventor: Keum-Mo Kim, Seoul, Rep. of Korea

[73] Assignee: Daewoo Electronics Co. Ltd., Seoul, Rep. of Korea

[21] Appl. No.: 777,535

[22] Filed: Dec. 30, 1996

[30]   Foreign Application Priority Data

Dec. 29, 1995 [KR] Rep. of Korea ............ 95-62754

[51] Int. Cl.$^6$ ........................................ G11B 5/42
[52] U.S. Cl. .......................... 29/603.04; 360/107
[58] Field of Search ............... 29/603.04, 603.05, 29/603.06; 360/107, 108

[56]   References Cited

U.S. PATENT DOCUMENTS 4,972,283   11/1990   Kim ........................ 360/107

*Primary Examiner*—Carl E. Hall
*Attorney, Agent, or Firm*—Foley & Lardner

[57]   ABSTRACT

Disclosed is a rotary head drum having a simplified structure, and a method for manufacturing thereof. An upper drum having at least two video heads formed at an outer bottom portion thereof is installed. A shaft is installed in the center portion of the upper drum. A deck portion on which said upper drum is installed, is vertically and upwardly bent by press working into cylinder shape having a shorter diameter than the upper drum. Then, a lower drum is formed on the outer portion of the deck by outsert molding under the upper drum at a predetermined distance apart from the upper drum. A number of complicated processes and assembling process for fixing the lower drum on the deck can be omitted. Thus, the obtained head drum has a simplified structure with less elements and has good quality.

6 Claims, 6 Drawing Sheets

METHOD OF MANUFACTURING A ROTARY HEAD DRUM

BACKGROUND OF THE INVENTION

1. Field of the Invention

The present invention relates to a rotary head drum and a method for manufacturing thereof, and more particularly to a rotary head drum having a reduced constitution and so having a simplified structure, and to an advantageous method for manufacturing thereof.

2. Description of the Prior Art

Generally, a magnetic recording/reproducing apparatus is an apparatus for recording an image and/or an audio signal onto a magnetic tape running along a running system or for reproducing recorded signals. The magnetic tape is wound on a pair of wheels provided in a cassette, and when the cassette is loaded into a deck of a tape recorder according to a loading mechanism, the pair of wheels are respectively mounted on a take-up reel table and a supply reel table installed on the deck. After completion of the installation, tape drawing members draw the tape from the cassette positioned at a loading place so that the tape makes contact with about a half of the circumference of the head drum. After that, a selected running operation such as playing, recording, fast forwarding, rewinding, etc. is carried out. At this time, the magnetic tape is drawn out from a wheel and wound around the other wheel according to the rotational direction of the take-up reel table and the supply reel table.

Elements for carrying out the deck mechanism of the above-described magnetic recording/reproducing apparatus will be described in detail with reference to the attached FIG. 1.

In the front and upper portion of a deck 19, a supply reel table 7a and a take-up reel table 7b for running a wound tape in the forward or reverse direction according to the mode selected by a user and according to the driving direction of a capstan motor after loading a magnetic tape, are provided on the same central line at a predetermined distance apart from each other. On deck 19 between supply reel table 7a and take-up reel table 7b, an idler device 6 for selectively being engaged with and rotating supply reel table 7a and take-up reel table 7b, is installed.

In the rear and upper portion of the deck, a drum base 18 fixedly installed with a certain inclination is provided in the rear portion of supply reel table 7a, and a head drum 10 fixedly installed with the same inclination as the drum base, is provided on deck 19. Guiding holes 9a and 9b having predetermined shapes are formed on deck 19 on the left side and the right side of head drum 10, that is, between supply reel table 7a and head drum 10 and between take-up reel table 7b and head drum 10, respectively. At the front portions of guiding holes 9a and 9b, a supply side slant pole assembly 8a and a take-up side slant pole assembly 8b are respectively provided. The slant pole assemblies draw the wound tape out when the cassette tape is loaded onto supply reel table 7a and take-up reel table 7b, and move along guiding holes 9a and 9b by a separate mechanical mechanism to the rear portion of head drum 10 so that the recording surface of the tape makes contact with the running surface on an upper drum 11 and a lower drum 12, which are elements of head drum 10.

Among the members constituting the magnetic recording/ reproducing apparatus, since the rotary head drum directly participates in recording and reproducing signals, the rotary head drum needs to be highly reliable and stable. FIG. 2 is a partial cross-sectional view for showing in detail the structure of the rotary head drum illustrated in FIG. 1. The constitution of the rotary head drum will be described in brief below.

Upper drum 11 having at least two video heads 15 for recording/reproducing information onto/from the tape at the outer bottom portion thereof by means of screws, and having a rotor transformer 11a at the inner bottom portion thereof, is inserted into the upper end portion of a shaft 14.

Under upper drum 11, cylindrical lower drum 12 having a stator transformer 12a corresponding to rotor transformer 11a is installed on a drum base 18 (see FIG. 2). At the outer periphery of lower drum 12, a lead line 20 for leading the running of the magnetic tape is formed. Between lower drum 12 and shaft 14, an upper bearing 16a and a lower bearing 16b are inserted so as to receive a pre-load.

A motor 13 in a housing, for generating a driving force is installed under lower drum 12. Motor 13 includes a stator 13a which could be magnetized when a current is applied to the center portion of stator 13a and a rotor 13b. Rotor 13b consists of a ring-shaped magnet attached to the inner periphery of the housing and positioned at a predetermined distance apart from stator 13a in a radial direction thereof. Rotor 13b rotates by the electromagnetic force generated by a reaction of rotor 13b with stator 13a.

Upper drum 11 rotates in a predetermined direction by the rotation of shaft 14 which receives the driving force from motor 13. Rotor transformer 11a installed at the inner bottom portion of upper drum 11 and related in a non-contacting manner with stator transformer 12a installed on lower drum 12, also rotates with upper drum 11 to transport the image signals received from video heads 15 to stator transformer 12a.

A lot of reports on the rotary head drum are widely known. See U.S. Pat. No. 5,392,180 (issued to Hasegawa), U.S. Pat. No. 4,972,283 (issued to Kim), U.S. Pat. No. 4,930,030 (issued to Yabu et al.), etc.

The rotary head drum is assembled on the deck. FIG. 3 is a perspective view of a head drum, a drum base on which the lower drum of the head drum is seated, and a deck, for showing the assembling state of the head drum on the deck.

First, upper drum 11, shaft 14 and lower drum 12 are assembled to complete head drum 10. Lower drum 12 of head drum 10 is seated on drum base 18, which is separately manufactured so as to have a predetermined inclination, and then lower drum 12 is assembled by screws 18b to have the same inclination as the drum base. Drum base 18 is assembled on deck 19 by screws 18a. After completing the assembling, head drum 10 is installed on deck 19, as shown in FIG. 1.

The lower drum of the head drum is generally formed by die casting. At this time, the surface of the lower drum is processed by a rough machining. Screw holes for assembling the head drum with the drum base are formed by a hole process of drilling and tapping. After the hole processing, the lead line is formed by a final machining. Then a washing process and a buffing process are carried out. The lower drum is seated on the drum base by means of screws, and then is seated on the deck by means of screws.

As described above, very minute workings and complicated processes are needed to manufacture the lower drum. This minuteness in workings increases the manufacturing cost. Moreover, an inclined drum base is needed to fix the lower drum on the deck. This increases the number of constituting elements. Further, since separate assembling processes are needed for assembling the lower drum to the drum base, and for assembling the drum base to the deck, the entire assembling process is very complicated and therefore, the yield of the product is deteriorated.

SUMMARY OF THE INVENTION

To solve the problems of the conventional art, it is an object of the present invention to provide a method for manufacturing a rotary head drum, in which a lower drum can be integrally formed with a deck, thereby eliminating a separate assembling process for the lower drum.

Another object of the present invention is to provide a rotary head drum having a simplified structure and having a lower drum integrally formed with a deck without a drum base by applying the above method.

To accomplish the object of the present invention, there is provided a method for manufacturing a rotary head drum comprising the steps of installing an upper drum having at least two video heads formed at an outer bottom portion of the upper drum and a shaft in a center portion of the upper drum, vertically and upwardly bending a main deck portion where the upper drum is installed by press working into a cylinder shape, the deck portion having a shorter diameter than the upper drum, and forming a lower drum on an outer portion of the deck with a predetermined distance apart from the upper drum by outsert molding under the upper drum.

A lead line for leading a running of a magnetic tape, can be formed at an outer periphery of the lower drum during the outsert molding or after the outsert molding and during a final machining.

Preferably, the deck is press worked into a shape of the lower drum formed on the the deck by the outsert molding, thereby fitting an upper surface of the deck to a lower surface of the lower drum.

The deck is inclined to a predetermined degree so that the lower drum and the upper drum are inclined to the predetermined degree.

Preferably, a protrusive portion facing an outer portion of the upper drum and a cylindrical boss portion having a hole center and facing an inner portion of the upper drum, are formed by the deck.

The other object of the present invention can be accomplished by a rotary head drum comprising an upper drum having at least two video heads formed at an outer bottom portion of the upper drum, a lower drum integrally formed with a deck by outsert molding under the upper drum at a predetermined distance apart, a lead line for leading a running of a magnetic tape being formed at an outer periphery of the lower drum, and a shaft installed at a center portion of the upper drum and the lower drum.

A rotor transformer is formed at an inner bottom portion of the upper drum and a stator transformer corresponding to the rotor transformer is formed at an inner upper portion of the deck.

Alternately, the rotor transformer is formed at the inner bottom portion of the upper drum and the stator transformer corresponding to the rotor transformer is formed at the inner upper portion of the lower drum.

Preferably, the deck includes a protrusive portion facing an outer portion of the upper drum, and a boss portion having a hole at center portion thereof and facing an inner portion of the upper drum, the protrusive portion being cylinder shape, having an outer periphery which is vertical to the deck, and having an inner periphery which is inclined with respect to the deck. Alternately, both of the outer periphery and the inner periphery of the protrusive portion can be inclined to the deck so that the protrusive portion is an inclined cylinder shape.

At this time, a lubricating means is provided in a space between the boss portion and the shaft, the lubricating means comprising a bearing housing and bearings which are provided at an upper end portion and at a lower end portion of the bearing housing.

BRIEF DESCRIPTION OF THE DRAWING

The above objects and advantages of the present invention will become more apparent by describing in detail preferred embodiments thereof with reference to the attached drawings in which.

DETAILED DESCRIPTION OF THE INVENTION

Hereinafter, the constituting elements and the operation principles of the rotary head drum according to preferred embodiments of the present invention will be explained in more detail with reference to the accompanying drawings.

Figure 1:
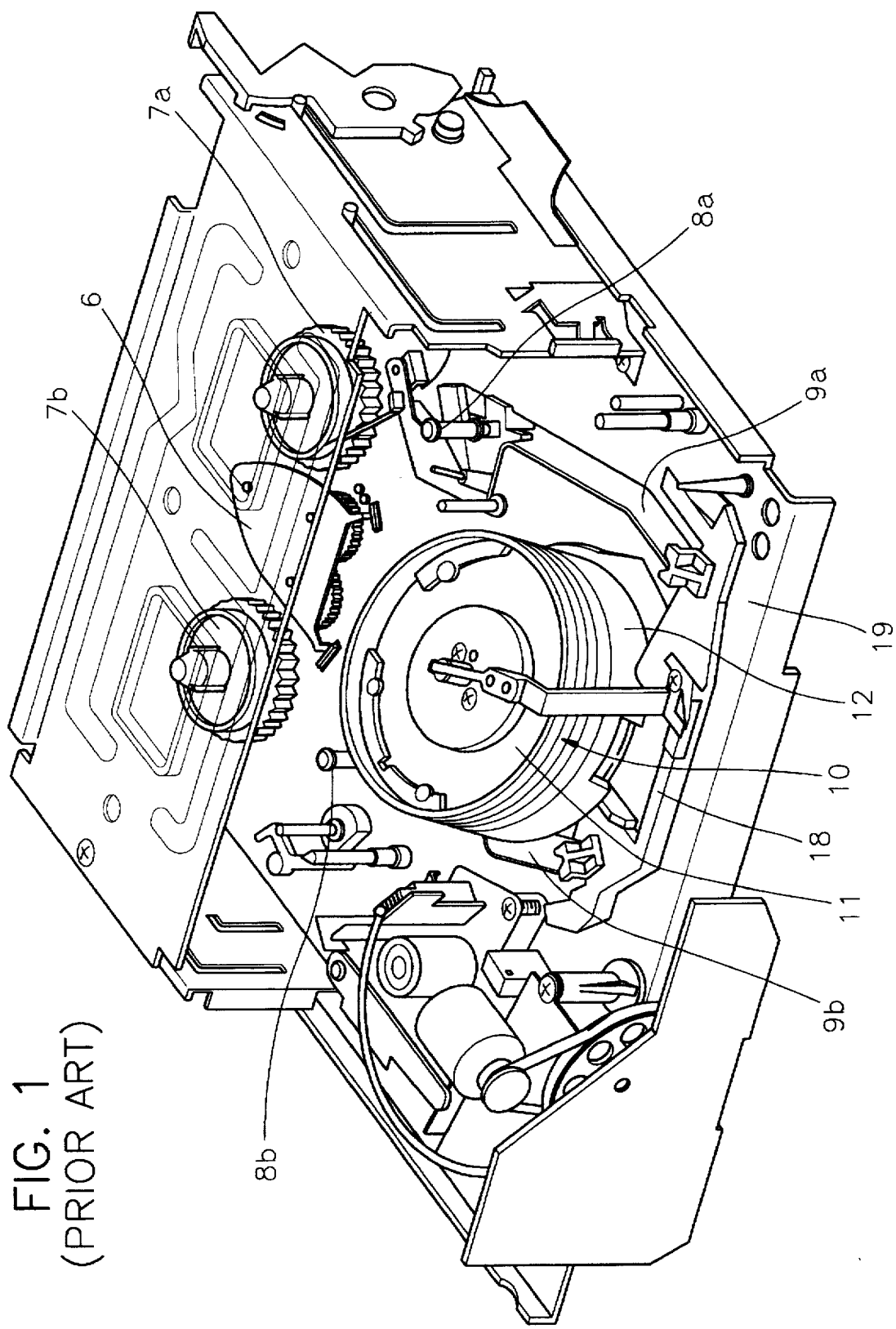
FIG. 1 is a perspective view for showing the internal structure of a conventional magnetic recording/reproducing apparatus.
Figure 2:
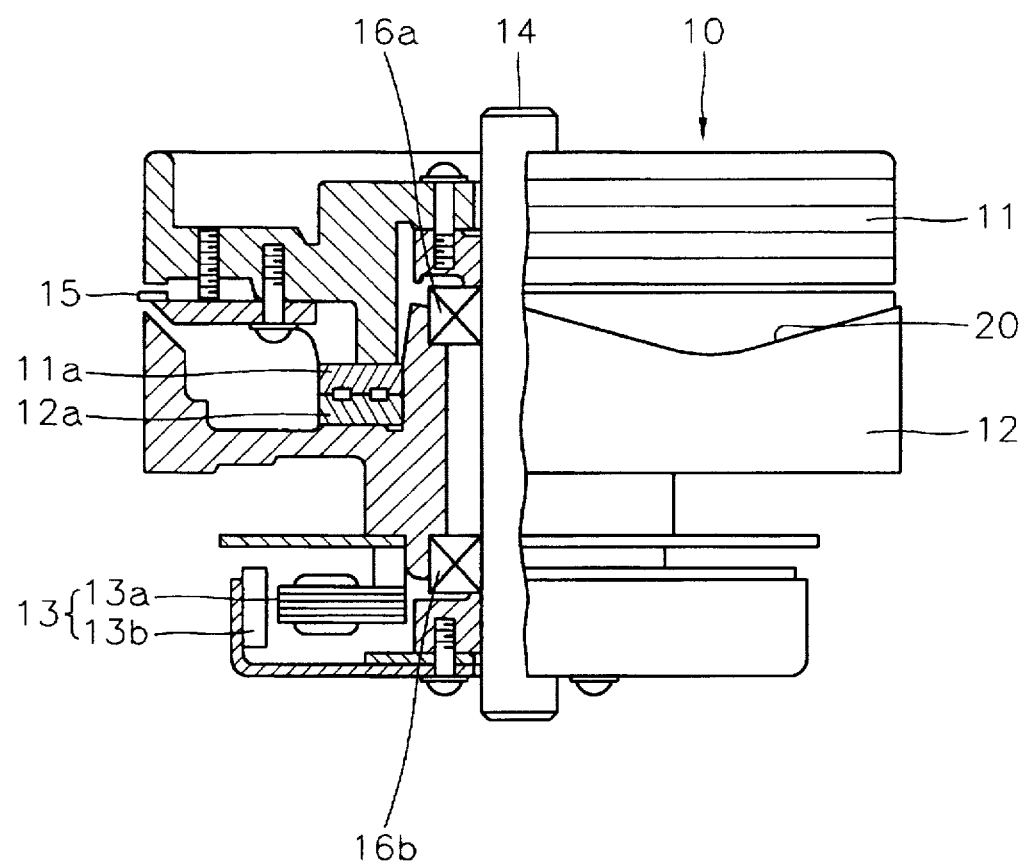
FIG. 2 is a partial sectional view and a partial front view of the rotary head drum shown in FIG. 1.
Figure 3:
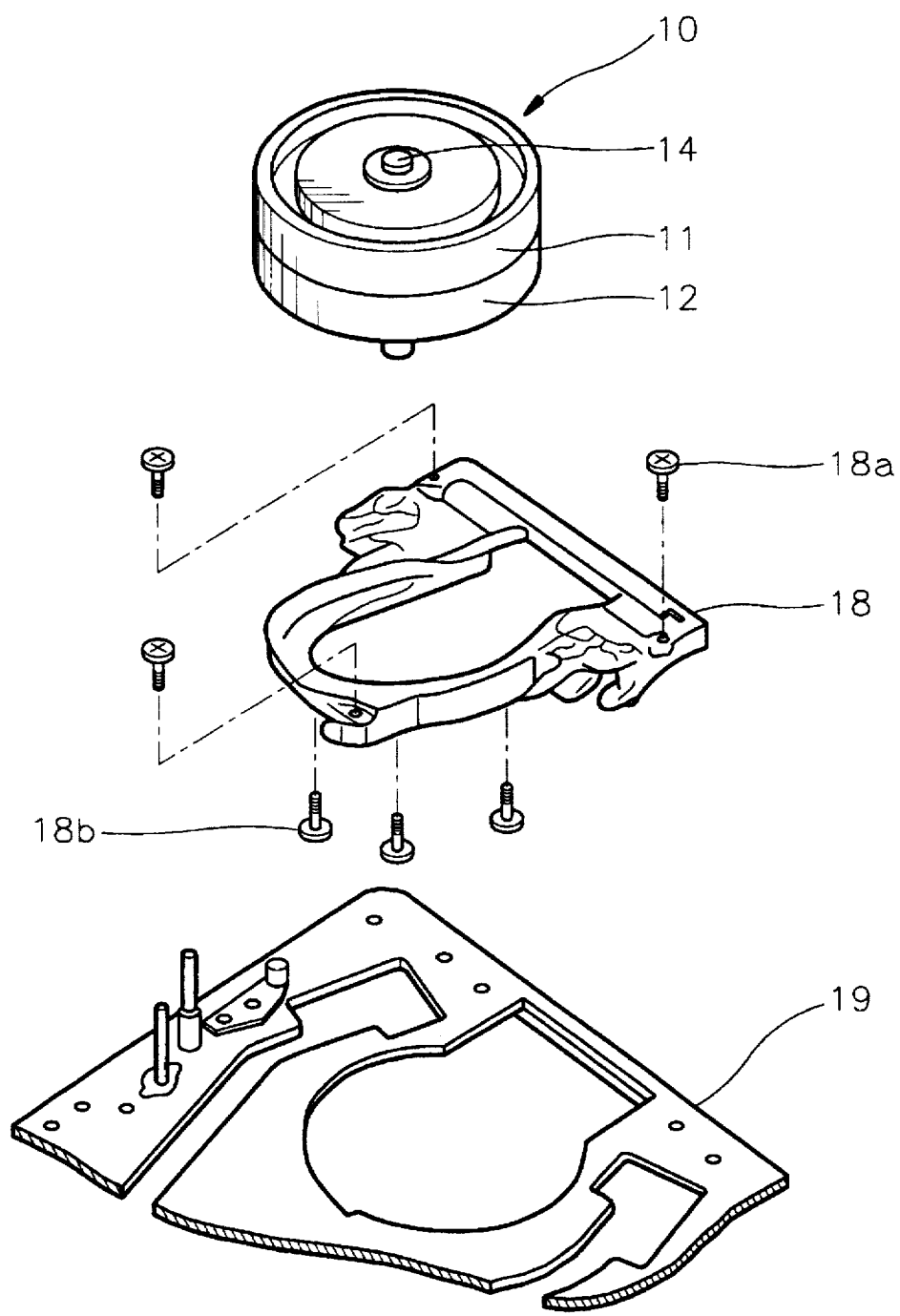
FIG. 3 is a partially exploded perspective view for showing the assembling method of the rotary head drum on a drum base and on a deck.
Figure 4:
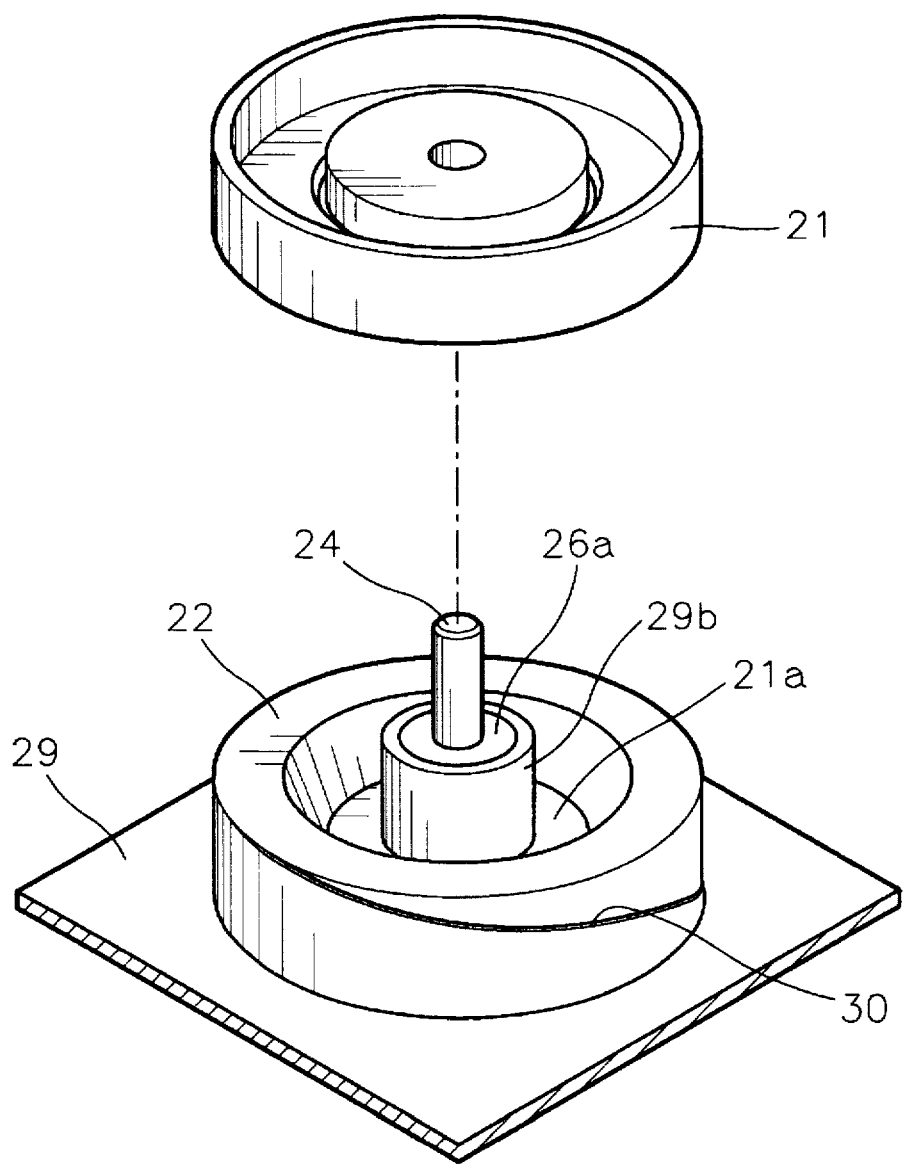
FIG. 4 is a partial perspective view of a rotary head drum according to an embodiment of the present invention.
Figure 5:
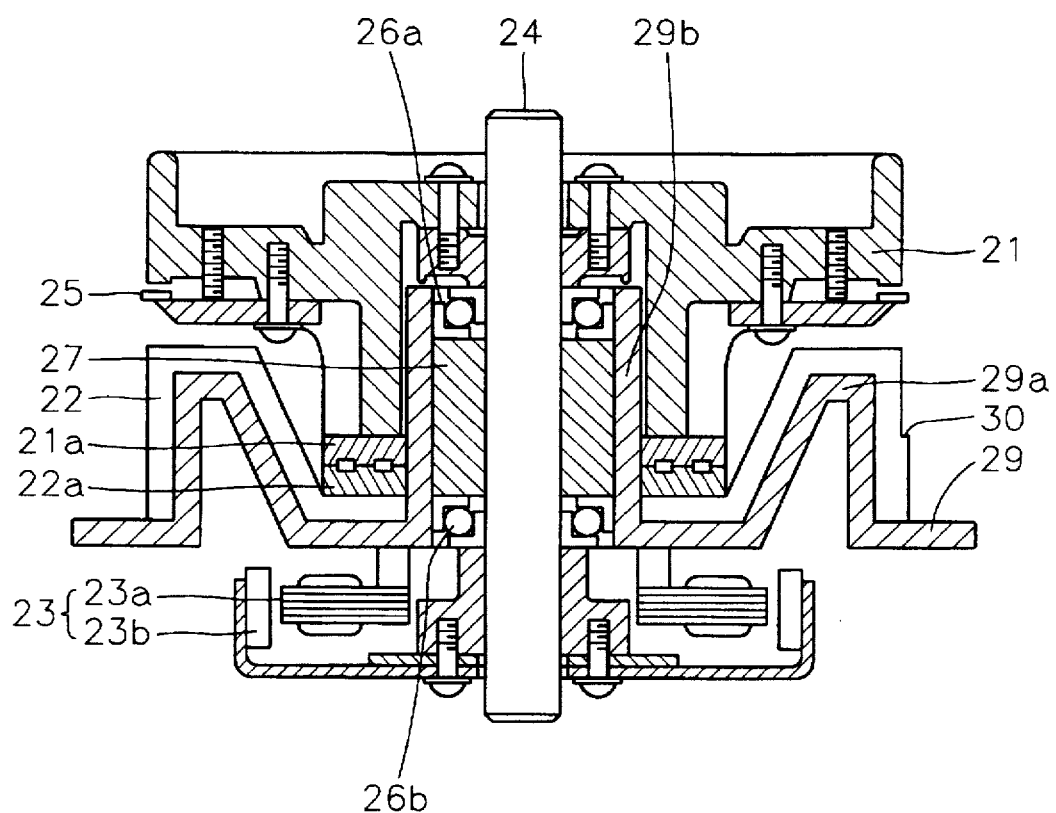
FIG. 5 is a sectional view of the rotary head drum shown in FIG. 4.

FIG. 4 is a partial perspective view of a rotary head drum manufactured by an embodiment of the present invention. In FIG. 5, a sectional view of the rotary head drum is illustrated.

The rotary head drum mainly includes an upper drum 21 having two video heads 25 separated by 180° degrees from each other and at the outer bottom portion of upper drum 21 for recording/reproducing an information onto/from a magnetic tape, and having a rotor transformer 21a at the inner bottom portion of upper drum 21, a cylindrical lower drum 22 formed under upper drum 21 and having stator transformer 22a corresponding to rotor transformer 21a, a shaft 24 into an upper end portion thereof, upper drum 21 is inserted by pressure, and a deck 29 bent in almost the same shape as lower drum 22 located under lower drum 22. Video heads 25 minutely protrude from upper drum 21 and lower drum 22. At the outer periphery of lower drum 22, a lead line 30 for leading the running of the magnetic tape is formed.

Under lower drum 22, a motor 23 for generating a driving force is installed in a housing. Motor 23 is provided with a stator 23a which might be transformed into a magnet when receiving a current, and a rotor 23b which might rotate by an electromagnetic force generated by a reaction of rotor 23b with stator 23a. Rotor 23b is formed by attaching a ring-shaped magnet and is positioned at the inner periphery of the housing at a predetermined distance apart from stator 23a in the radial direction of stator 23a.

Upper drum 21 rotates in a predetermined direction by the rotation of shaft 24 which receives a driving force from motor 23. Rotor transformer 21a installed at the inner bottom portion of upper drum 21 rotates with upper drum 21 and transports image signals received from video heads 25 to stator transformer 23a. Rotor transformer 22a transports the signals to stator transformer 22a in a non-contact manner.

The deck portion bent in the same shape as lower drum 22 and positioned under lower drum 22, is provided with a cylindrical protrusive portion 29a having an outer periphery which is vertically and upwardly bent and having an inner periphery which is inclined with respect to the deck portion, and with a boss portion 29b having a hole in the center portion thereof. Protrusive portion 29a gives a cylindrical shape to the lower drum. And boss portion 29b is formed for receiving an upper bearing 26a, a lower bearing 26b and a bearing housing 27 inserted between upper and lower bearings 26a and 26b in a space formed between boss portion 29b and shaft 24. Upper bearing 26a and lower bearing 26b are formed so as to receive pre-loads.

In the rotary head drum having the above-mentioned constitution, when a current is applied to stator 23a which is a member of motor 23, rotor 23b positioned at the inner periphery of the housing at a predetermined distance in the radial direction from stator 23a, starts to rotate by the electromagnetic force generated by a reaction of rotor 23b with stator 23a. When rotor 23b rotates, shaft 24 connected to rotor 23b, starts to rotate, and upper drum 21 which has been inserted into shaft 24 by pressure, also staffs to rotate. Then, video heads 25 formed at the outer bottom portion of upper drum 21 and electrically connected with rotor transformer 21a, scans the signal tracks of a running tape one by one to record/reproduce an information onto/from the tape making contact with the outer periphery of rotating upper drum 21 and fixed lower drum 22.

Lower drum 22 is integrally formed with bent deck 29 by means of outsert molding in the present invention. Outsert molding is a method for molding a functional portion on a material such as a metal plate by injection molding. First, deck 29 is press worked to obtain protrusive portion 29a in order to fit lower drum 22 to upper drum 21, and to obtain boss portion 29b for installing bearings 26a and 26b when needed, as shown in FIG. 4. On deck 29, lower drum 22 is formed by outsert molding using a metal mold in a one-step process. Lead line 30 formed at the outer periphery of lower drum 22 can be formed by final machining after the molding or can be formed during molding by using a minute metal mold.

At this time, since the head drum should be inclined with respect to the deck line, deck 29 should be bent to a predetermined inclination during the press working so that the lower drum could be formed with the same inclination.

When lower drum 22 is formed on deck 29 by outsert molding using an injection molding material such as thermoplastic plastics according to the present invention, lower drum 22 doesn't need to be separately manufactured and assembled on a drum base. Therefore, the manufacturing of screw holes is not needed. That is, hole-making process can be omitted. Further, when lead line 30 is formed during the molding, the final machining process for forming the lead line can also be omitted.

Figure 6:
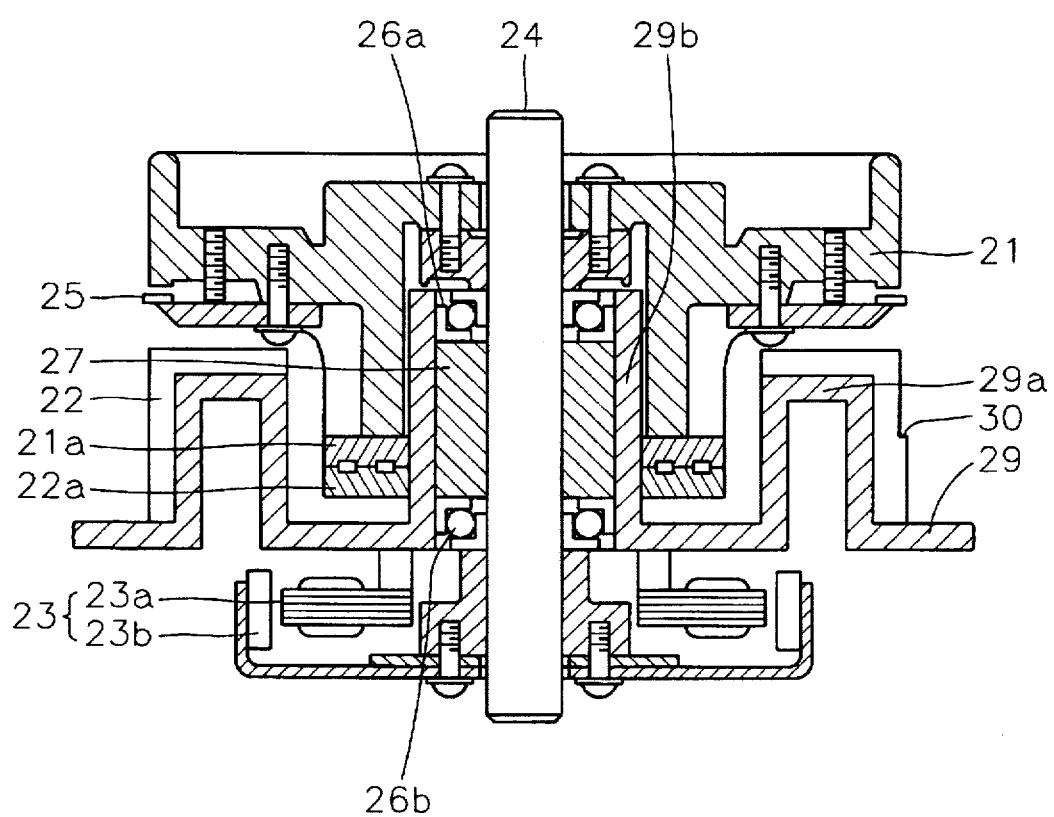
FIG. 6 is a partial perspective view of a rotary head drum according to another embodiment of the present invention.

In FIG. 5, lower drum 22 is formed on protrusive portion 29a and extends to boss portion 29b, and stator transformer 22a corresponding to rotor transformer 21a is formed on lower drum 22. However, lower drum 22 can only be formed on protrusive portion 29a. In this case, stator transformer 22a is formed on deck 29. Further, the outer periphery of protrusive portion 29a is vertically bent and the inner periphery thereof is inclined with respect to the base line of the deck in this drawing. However, both peripheries can be bent vertically. In FIG. 6, the outer and inner peripheries of protrusive portion 29a are vertically bent and lower drum 22 is formed only on protrusive portion 29a. Accordingly stator transformer 22a is formed on deck 29.

As a modification of the present invention, the lower drum can be integrally formed with the deck by molding. In this case, the lead line can be formed during the molding or during the final machining after the molding.

If the lower drum is formed on the deck by outsert molding according to the present invention, the manufacture of the lower drum is very simple and the material cost can be reduced. Particularly, the manufacturing of the lower drum can be carried out during formation of molded products for combining other components on the deck. Since the assembling process using the drum base can be omitted, the manufacturing is very advantageous and the manufacturing cost is reduced.

In addition, since the rotary head drum is integrally formed with the deck, the conventional drum base is not needed. This reduces the number of constituting elements and the number of assembling processes. Accordingly, the yield of the product can be increased and the product quality can be improved by reducing the ratio of defective products.

Although the preferred embodiment of the invention has been described, it is understood that the present invention should not be limited to the preferred embodiment, but various changes and modifications can be made by one skilled in the art within the spirit and scope of the invention as hereinafter claimed.

What is claimed is:

1. A method for manufacturing a rotary head drum comprising the steps of:

installing an upper drum having at least two video heads formed at an outer bottom portion of said upper drum, and having a shaft in a center portion of said upper drum;

vertically and upwardly bending a deck portion where said upper drum is installed by press working into a cylinder shape, said deck portion having a shorter diameter than said upper drum; and forming a lower drum on an outer portion of said deck by outsert molding under said upper drum at a predetermined distance apart from said upper drum.

2. A method for manufacturing a rotary head drum as claimed in claim 1, wherein a lead line for leading a running of a magnetic tape, is formed at an outer periphery of said lower drum during said outsert molding.

3. A method for manufacturing a rotary head drum as claimed in claim 1, wherein said lead line for leading a running of a magnetic tape, is formed at an outer periphery of said lower drum after said outsert molding and during a final machining.

4. A method for manufacturing a rotary head drum as claimed in claim 1, wherein said deck is press worked into a shape of said lower drum formed on said deck by said outsert molding, thereby fitting an upper surface of said deck to a lower surface of said lower drum.

5. A method for manufacturing a rotary head drum as claimed in claim 1, wherein said deck is inclined to a predetermined degree so that said lower drum and said upper drum are inclined to the predetermined degree.

6. A method for manufacturing a rotary head drum as claimed in claim 1, wherein a protrusive portion facing an outer portion of said upper drum and a cylindrical boss portion having a hole at a center thereof and facing an inner portion of said upper drum, are formed by said deck.

* * * * *